(12) United States Patent
Anderson et al.

(10) Patent No.: US 8,250,479 B2
(45) Date of Patent: Aug. 21, 2012

(54) MESSAGE FLOW INTERACTIONS FOR DISPLAY IN A USER INTERFACE

(75) Inventors: Mark A. Anderson, Cary, NC (US); Cerelisa C. Burr, Cary, NC (US); Scott B. Greer, Cary, NC (US); Richard B. Southard, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 11/940,816

(22) Filed: Nov. 15, 2007

(65) Prior Publication Data

US 2009/0132936 A1    May 21, 2009

(51) Int. Cl.
*G06F 3/048* (2006.01)
(52) U.S. Cl. .................................. 715/764; 705/7.11
(58) Field of Classification Search .......... 715/733, 715/734, 735, 736; 709/223, 224; 705/7.11, 705/7.15, 7.28, 7.36–7.42
See application file for complete search history.

(56) References Cited

U.S. PATENT DOCUMENTS

| | | | |
|---|---|---|---|
| 7,337,440 B1 | 2/2008 | Schmidt et al. | |
| 7,774,720 B1 * | 8/2010 | Demetriades et al. | 715/853 |
| 2003/0055624 A1 | 3/2003 | Fletcher et al. | |
| 2003/0055868 A1 * | 3/2003 | Fletcher et al. | 709/201 |
| 2003/0163513 A1 | 8/2003 | Schaeck et al. | |
| 2003/0191769 A1 * | 10/2003 | Crisan et al. | 707/100 |
| 2004/0249645 A1 * | 12/2004 | Hauser et al. | 705/1 |
| 2006/0031481 A1 * | 2/2006 | Patrick et al. | 709/224 |
| 2006/0143229 A1 * | 6/2006 | Bou-Ghannam et al. | 707/104.1 |
| 2006/0184410 A1 * | 8/2006 | Ramamurthy et al. | 705/8 |
| 2007/0101272 A1 * | 5/2007 | Nomura et al. | 715/734 |
| 2007/0168201 A1 | 7/2007 | Chellam | |
| 2007/0208582 A1 * | 9/2007 | Chellam et al. | 705/1 |
| 2008/0082987 A1 * | 4/2008 | Mao et al. | 719/313 |
| 2008/0120129 A1 * | 5/2008 | Seubert et al. | 705/1 |
| 2008/0259930 A1 * | 10/2008 | Johnston et al. | 370/395.2 |
| 2008/0301135 A1 * | 12/2008 | Alves et al. | 707/6 |
| 2009/0132958 A1 | 5/2009 | Greer et al. | |

OTHER PUBLICATIONS

De Pauw et al., Web Services Navigator: Visualizing the execution of Web Services, IBM Systems Journal, vol. 44, No. 4, IBM Corporation, 2005.

(Continued)

*Primary Examiner* — Weilun Lo
*Assistant Examiner* — Enrique Iturralde
(74) *Attorney, Agent, or Firm* — Marcia L. Doubet

(57) ABSTRACT

Display of message flow interactions corresponding to service invocations in a computing environment based on a service-oriented distributed computing model. Aggregations are created, where multiple instances of a particular deployed service operation may be represented by a single node (even though those instances may be hosted on different application servers). Links are depicted between the nodes, where the links represent call paths or invocations among the service operations. A user obtains a high-level, in-context view of the as-observed interactions among service operation instances, and may drill down for further details. A presentation to the user can be automatically scoped to the set of services which are observed as interacting (i.e., via their call relationships), so that the user can be shown that part of the environment that is immediately relevant to a context in which the user launches the view.

13 Claims, 15 Drawing Sheets

OTHER PUBLICATIONS

Wrolstad, Jay, IBM Delivers Self-Healing Software for Tivoli Platform, Sci-Tech Today, pp. 1-5, Dec. 6, 2005 <http://www.sci-tech-today.com/news/IBM-Delivers-Self-Healing-Software/story.xhtml?story_id=012001C8E9WC>, printed Oct. 25, 2007.

Tivoli Composite Application Manager for SOA, IBM Corporation, pp. 1-2, <http://www-306.ibm.com/software/tivoli/products/composite-application-mgr-soa/>., printed Oct. 25, 2007.

SOA Management, IBM Tivoli Software, IBM Corporation, pp. 1-2, <http://www-306.ibm.com/software/tivoli/features/soa/index.html>., printed Oct. 25, 2007.

Application Management Buyer's Guide, IBM Corporation, p. 1 of 1, <http://www-306.ibm.com/software/tivoli/resource-center/application-management/bg-app-mgmt.jsp>., printed Oct. 25, 2007.

Composite Applications and the Application Management Life Cycle, IBM Corporation, p. 1 of 1, <http://www-306.com/software/tivoli/resource-center/application-management/ar-composite-applications-meta.jsp>., printed Oct. 25, 2007.

Composite Application Management DeveloperWorks, IBM Corporation, pp. 1-5, <http://www.ibm.com/developerworks/tivoli/application-mgmt>., printed Oct. 25, 2007.

Security and Mangaement for SOA Environments, Service Oriented Architecture Solutions White Paper, IBM Corporation, Aug. 2006, 12 pages.

Event Correlation and Automation, IBM Corporation, Page last updated on Jul. 13, 2006, pp. 1-3 <http://www-306.ibm.com/software/tivoli/solutions/event/>., printed Oct. 25, 2007.

IBM T.J. Watson Research Center, IBM Web Services Navigator, alphaWorks: IBM Web Services Navigator, IBM Corporation, Posted on Dec. 2, 2004, pp. 1-2, <http://alphaworks.ibm.com/tech/wsnavigator>.

Scott B. Greer, et al., U.S. Appl. No. 11/940,877, filed Nov. 15, 2007, Office Action, Jan. 20, 2011, 12 pages.

Scott B. Greer, et al., U.S. Appl. No. 11/940,877, filed Nov. 15, 2007, Office Action, May 26, 2011, 15 pages.

Scott B. Greer, et al., U.S. Appl. No. 11/940,877, filed: Nov. 15, 2007, Office Action, Feb. 27, 2012, 15 pages.

* cited by examiner

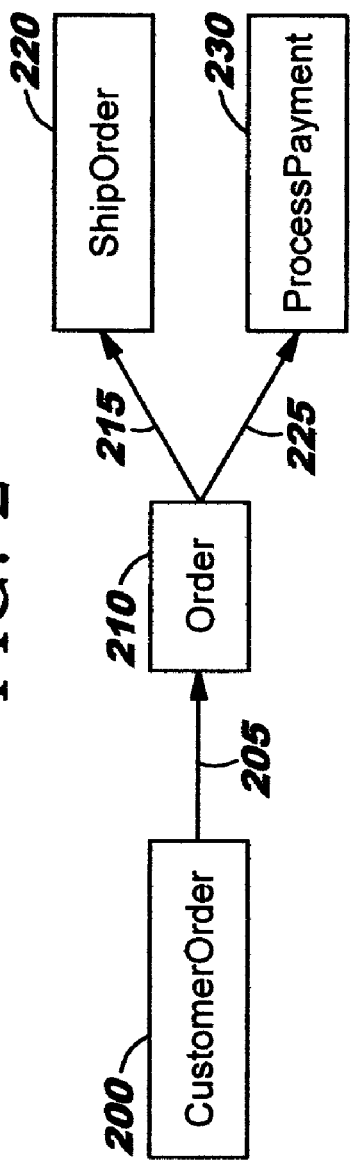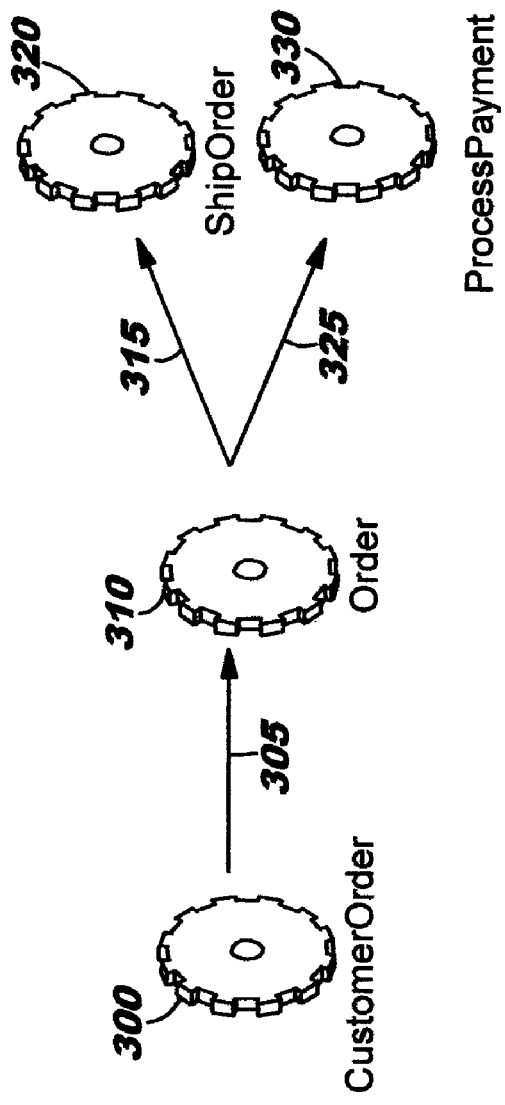

```xml
<?xml version="1.0" encoding="UTF-8"?>
<graph
    xmlns="http://www.ibm.com/management/soa/exampleNameSpace"
    xmlns:ss="http://www.ibm.com/management/soa/soaDiscoveryGraph"
    xmlns:xsi="http://www.w3.org/2001/XMLSchema-instance"
    xsi:schemaLocation="http://www.ibm.com/management/soa/exampleNameSpace exampleNameSpace.xsd">
410     <node guid="aa0f5d73-11f4-36d4-9054-6f14fc4a2f8f"        411
              nodeType="OpAgg">
412         <label>order</label>
413         <ss:OpAgg degraded="0" index="0"
                      instances="1" situations="0" status="0" />
        </node>
420     <node guid="af6be1df-8285-354a-a928-48cd05aeedff"
              nodeType="OpAgg">
            <label>customerOrder</label>
            <ss:OpAgg degraded="0" index="0"
                      instances="1" situations="0" status="0" />
        </node>
430     <node guid="80f25dfd-ed56-339c-93ae-6640fdd20e3e"        431
              nodeType="OpAgg">
            <label>shipOrder</label>
            <ss:OpAgg degraded="0" index="0"
                      instances="1" situations="0" status="0" />
        </node>
440     <node guid="16a4ed9e-f75e-3b47-9115-c0d3cc183c11"
              nodeType="OpAgg">
            <label>processPayment</label>
            <ss:OpAgg degraded="0" index="0"
                      instances="1" situations="0" status="0" />
        </node>
```

FIG. 4 (cont'd)

```
450   <link ┌─ 451
      guid="aa0f5d73-11f4-36d4-9054-6f14fc4a2f8f80f25dfd-ed56-339c-93ae-6640fdd20e3e"
      linkType="callPath">
452     <source>aa0f5d73-11f4-36d4-9054-6f14fc4a2f8f</source>
453     <target>80f25dfd-ed56-339c-93ae-6640fdd20e3e</target>
454     <ss:callPath CRAvgLen="0" CRAvgTime="0" CRFaults="-1"
             CRMaxLen="-1" CRMaxTime="-1" CRMinLen="-1" CRMinTime="-1"
             CRMsgs="-1" />
      </link>
460   <link
      guid="aa0f5d73-11f4-36d4-9054-6f14fc4a2f8f16a4ed9e-f75e-3b47-9115-c0d3cc183c11"
      linkType="callPath">
        <source>aa0f5d73-11f4-36d4-9054-6f14fc4a2f8f</source>
        <target>16a4ed9e-f75e-3b47-9115-c0d3cc183c11</target>
        <ss:callPath CRAvgLen="0" CRAvgTime="0" CRFaults="-1"
             CRMaxLen="-1" CRMaxTime="-1" CRMinLen="-1" CRMinTime="-1"
             CRMsgs="-1" />
      </link>
470   <link
      guid="af6be1df-8285-354a-a928-48cd05aeedffaa0f5d73-11f4-36d4-9054-6f14fc4a2f8f"
      linkType="callPath">
        <source>af6be1df-8285-354a-a928-48cd05aeedff</source>
        <target>aa0f5d73-11f4-36d4-9054-6f14fc4a2f8f</target>
        <ss:callPath CRAvgLen="0" CRAvgTime="0" CRFaults="-1"
             CRMaxLen="-1" CRMaxTime="-1" CRMinLen="-1" CRMinTime="-1"
             CRMsgs="-1" />
      </link>
      </graph>
```

- 501 Operation A on machine 1 gets called from unknown (unmonitored) source
- 502 Operation A on machine 1 calls Operation B on machine 2
- Operation B on machine 2 calls Operation D on machine 2
- Operation D on machine 2 calls Operation E on machine 3
- 511 Operation A on machine 4 gets called from unknown (unmonitored) source
- 512 Operation A on machine 4 calls Operation B on machine 2
- Operation B on machine 2 calls Operation D on machine 2
- Operation D on machine 2 calls Operation E on machine 3
- 521 Operation A on machine 1 gets called from unknown (unmonitored) source
- 522 Operation A on machine 1 calls Operation B on machine 2
- Operation B on machine 2 calls Operation D on machine 2
- Operation D on machine 2 calls Operation E on machine 3
- 531 Operation A on machine 4 gets called from unknown (unmonitored) source
- 532 Operation A on machine 4 calls Operation B on machine 2
- Operation B on machine 2 calls Operation D on machine 2
- Operation D on machine 2 calls Operation E on machine 5
- 541 Operation C on machine 3 is initiated and calls Operation D on machine 2
- Operation D on machine 2 calls Operation E on machine 5
- Operation E on machine 5 calls Operation F on machine 3
- 551 Operation G on machine 4 gets called from unknown (unmonitored) source
- Operation G on machine 4 calls Operation H on machine 2
- Operation H on machine 2 calls Operation I on machine 2
- Operation I on machine 2 calls Operation J on machine 5
- 561 Operation A on machine 4 gets called from unknown (unmonitored) source
- Operation A on machine 4 calls Operation H on machine 2
- Operation H on machine 2 calls Operation I on machine 2
- Operation I on machine 2 calls Operation J on machine 5

MESSAGE FLOW INTERACTIONS FOR DISPLAY IN A USER INTERFACE

CROSS-REFERENCE TO RELATED APPLICATION

The present application is related to commonly-assigned U.S. patent application Ser. No. 11/940,877, titled "Distinct Groupings of Related Objects for Display in a User Interface" and filed concurrently herewith, which is hereby incorporated herein as if set forth fully (and which is referred to herein as "the related application").

BACKGROUND OF THE INVENTION

The present invention relates to computers, and deals more particularly with display of message flow interactions corresponding to service invocations in a computing environment based on a service-oriented distributed computing model.

The term "Service-Oriented Architecture", or "SOA", is used to refer to a distributed computing model whose smallest unit of work is a service operation (where the term "service operation" refers to executable code that performs at least a portion of a service). A particular SOA solution (i.e., a deployed SOA implementation) may comprise dozens or even hundreds of these service operations, and many occurrences of each service operation may exist as the operations are distributed, often redundantly, throughout an enterprise. As a result, an SOA solution may be potentially large and complex, and thus difficult to manage. This is further compounded by the complex relationships that may exist among service operations and the underlying information technology ("IT") infrastructure, such as application servers and the computers and networks upon which they are hosted.

Thus, these potentially numerous service operations may interact with each other and the underlying infrastructure in ways that make key systems management activities such as triage, impact analysis, and causal analysis very difficult if not impossible. Because an SOA solution is often deployed in an ad hoc manner, even basic tasks such as visualizing or navigating the call relationships among services may be impossible when using known techniques. When using known techniques, systems operators do not have a mechanism for isolating SOA problems and understanding their impacts and potential root causes; tracing individual transactions is both tedious and potentially incomplete since it does not reflect IT relationships.

BRIEF SUMMARY OF THE INVENTION

The present invention is directed to displaying message flow interactions corresponding to service operations in an SOA environment. In one embodiment, this comprises: determining, for a plurality of service operations comprising an SOA solution in the SOA environment, at least one selected one of the plurality of service operations for which at least one observed instance thereof has been executed; aggregating, for each of the selected ones, information pertaining to at least one of the observed instances which has been executed, wherein at least one of the aggregations comprises information pertaining to at least two observed instances; and displaying, on a user interface, at least one message flow interaction corresponding to the aggregations. The displaying may further comprise: creating, for each of the selected service operations, a node to represent the aggregation; creating, for each of the nodes from the aggregated information, zero or more inbound links, wherein each of the inbound links created for a particular one of the nodes represents an aggregation, for each different one of the plurality of service operations for which at least one of the observed instances of the different one has called at least one of the observed instances of the selected service operation for which the node represents the aggregation, of those at least one calling instances; creating, for each of the nodes from the aggregated information, zero or more outbound links, wherein each of the outbound links created for a particular one of the nodes represents an aggregation, for each different one of the plurality of service operations for which at least one of the observed instances of the different one has been called by least one of the observed instances of the selected service operation for which the node represents the aggregation, of those at least one called instances; and displaying, on the user interface, the at least one message flow interaction, each of the displayed message flow interactions comprising a graphical representation corresponding to at least a first one of the created nodes, each of its zero or more inbound links, and each of its zero or more outbound links and, for each of the inbound and outbound links in a recursive manner, a graphical representation corresponding to a second one of the nodes which aggregates one of the service operations that calls or is called by, respectively, the service operation aggregated by the first node. The displayed graphical representation corresponding to each of the nodes may be selectable from the user interface and responsive to selecting one of the displayed graphical representations, a drill-down view may be displayed that comprises a graphical representation of each of the observed instances which were aggregated to create the corresponding node. The drill-down view may further comprise, for each of the zero or more inbound links created for the corresponding node, a graphical representation of each of the observed instances which were aggregated to create the inbound link and for each of the zero or more outbound links created for the corresponding node, a graphical representation of each of the observed instances which were aggregated to create the outbound link. The nodes, the inbound links, and the outbound links may be persisted using syntax in a markup language document. In one approach, each of the links is identified using a unique identifier that comprises a concatenation of a first unique identifier that identifies a source node for the link and a second unique identifier that identifies a target node for the link.

Embodiments of these and other aspects of the present invention may also, or alternatively, be provided as systems or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 2 illustrates a sample result set display comprising example nodes and links, and FIG. 3 provides an alternative display of this information using different graphical symbols;

FIG. 4 provides a sample markup language document that illustrates one approach to recording information about nodes and links, according to an embodiment of the present invention;

FIGS. 5-8 provide sample data for illustrating operation of the logic of FIG. 1;

DETAILED DESCRIPTION OF THE INVENTION

Figure 1:
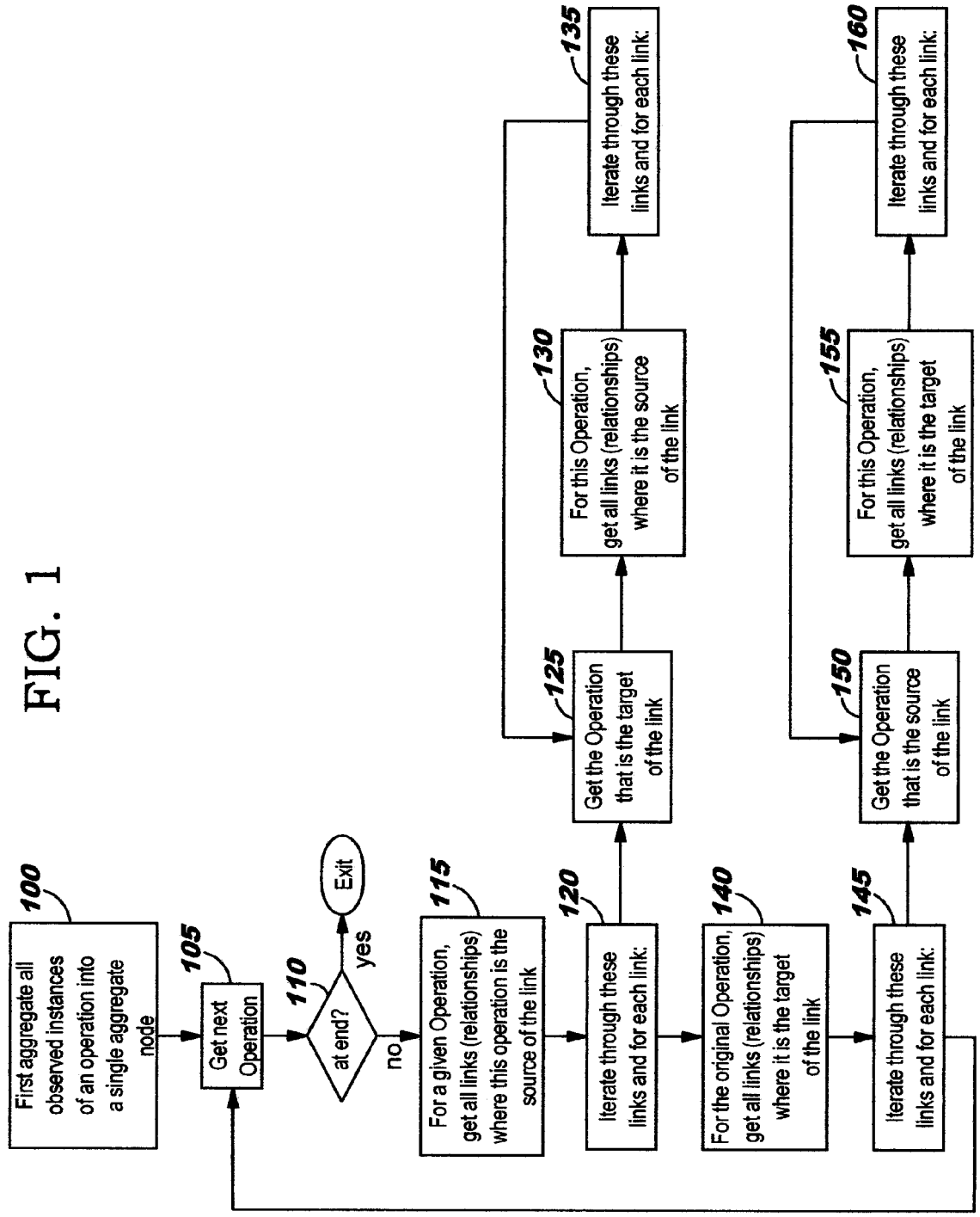
FIG. 1 provides a flowchart depicting logic that may be used when implementing an embodiment of the present invention.

Several problems in managing SOA solutions using known techniques were noted earlier. An embodiment of the present invention addresses (at least some of) the existing problems using what is referred to herein as a "service-to-service" topology. This topology is programmatically derived from observed service operation invocations, where such observations are performed by an agent or monitoring process, and these observed invocations are then aggregated into call relationships among operations and their services according to an embodiment of the present invention. These call relationships, in turn, may be organized into what is referred to herein as "service flows". An embodiment of the present invention presents this service-to-service topology in context, without requiring a user to perform any tedious navigation or filtering, and automatically scopes the presentation to the set of services which are observed as interacting (i.e., via their call relationships).

A classical approach for viewing interactions of an SOA solution involves large-scale modeling, whereby the system must understand, in advance, exactly what may need to be presented and how it should be organized and scoped. This modeling approach quickly becomes unwieldy for even a relatively simple SOA solution.

Another existing approach is to organize the presentation around discrete message information. In this existing approach, each message from a first node to a second node is identified, and these individual message interactions are made available for presentation to the user. For example, if a node "A" calls a node "P" and this node "P" in turn calls a node "Z", and another node "B" also calls node "P" which then calls node "Q", then an existing approach notifies the user of (1) the message interaction between nodes A, P, and Z and (2) the message interaction between nodes B, P and Q. However, this existing approach provides no indication that the two interactions involving node P may be related to one another, and thus does not provide an overall "flow" for the messages. It may therefore be too disjoint and too discrete for a user to grasp an overall system view that is useful for systems management, especially in scenarios encountered in complex business environments. It may be difficult for the user to easily see, for example, that a problem at node P may be caused by something other than node A and/or such problem may impact something other than node Z. A complex SOA solution might exchange messages between hundreds or thousands of nodes, for example, and without a structured means of presenting this information for the user, the user is left to somehow discern that a message interaction between nodes A, P, and Z, which might appear near the top of a scrollable list of message interactions, is related to a message interaction between nodes B, P and Q, which might appear at some random location within this scrollable list.

Existing techniques generally result in an SOA solution that is unmanageable. The sheer volume of data involved may result in a display that is unwieldy and tedious to navigate. Furthermore, a massive investment of time and resources may be required to set up and manage large amounts of data and modeling thereof when using existing techniques. Users may be required to spend a significant amount of time browsing or searching that data to accomplish their tasks. This may involve inspecting records from logs, which generally pertain to activities at a single application server and which would not provide a cross-system perspective. Users would likely struggle to isolate problems and investigate upstream/downstream root causes, and it is unlikely that a user would be able to understand application server impacts on the overall SOA solution and the business function it provides.

The service operations that are invoked during a particular transaction or flow when using a computing environment based on a service-oriented architecture may execute on the same application server, or on different application servers. The call relationships may therefore form a mesh network. An embodiment of the present invention enables a user to better understand the calls (or equivalently, invocations) in such a complex mesh, and to better understand relationships and impacts between these calls and underlying resources such as hardware, communication networks, and so forth. Diagnosing or predicting problems may also be facilitated. (Systems management may also be facilitated in less complex environments when using an embodiment of the present invention.)

According to an embodiment of the present invention, an application server hosting a service operation or operations also executes an agent or monitoring process that detects invocations among service operations. Notably, the detected invocations include not only invocations among service operations hosted on a particular application server, but also invocations "in" and invocations "out" with regard to that particular application server. An invocation "in", as that term is used herein, is an invocation from a service operation hosted on a different application server and targeting a service operation hosted on the particular application server, and an invocation "out", as that term is used herein, is an invocation from a service operation hosted on the particular application and targeting a service operation hosted on a different application server.

An embodiment of the present invention iteratively inspects these relationships, and their nodes (i.e., relationship endpoints), to determine relationship groups. Aggregations of the invocations, or call relationships, among service operations can be determined. These aggregations may be usable for determining upstream or downstream impacts on processing within the SOA solution. A presentation to the user can therefore be automatically scoped, so that the user can be shown that part of the SOA solution that is immediately relevant to a context in which the user launches the view. For example, a problem may be investigated by showing the set of flows that pass through a particular application server (and which are therefore dependent on the operational state of the application server). The user interface, when using this approach, presents a logical view whereby the presentation may be organized in terms of operation aggregates and operation instances. The aggregates represent a set of call relationships, thus helping the user understand an overall services flow and facilitating "drill-down" navigation among the potentially numerous instances represented by the aggregates.

This approach of using observed data, according to an embodiment of the present invention, relieves the user or system administrator of having to create complex system models or other interactions (such as creating definitions of configurations within the SOA solution). In addition to avoiding the tedium and maintenance issues associated with a model-based or configuration-based approach, an embodiment of the present automatically adapts to a changing or evolving SOA solution.

Turning now to FIG. 1, a flowchart is provided depicting logic that may be used when implementing an embodiment of the present invention. As shown therein, the observed instances of a particular operation are first aggregated, where this aggregation will be represented by a single node (Block 100) for presentation on a user interface. Each operation is then processed, as will now be described.

Block 105 gets the next operation to be processed, and Block 110 tests whether the processing for all operations is at the end. This test has a positive result if all of the operations have already been processed, in which case control exits from FIG. 1. Otherwise, processing continues at Block 115.

Blocks 115-160 comprise the processing for the operation obtained at Block 105. In Block 115, all links (i.e., relationships) are obtained which have this operation as the source of the link (if any). Suppose, for example, that the operation obtained at Block 105 is named "order". Further suppose that 2 links exist that specify this "order" operation as the source. Block 115 therefore obtains these 2 links.

Block 120 indicates that an iterative process is performed on the link(s) obtained at Block 115. (If no links were found, then this operation may be the last operation invoked in a message flow; processing for this operation continues at Block 140, which is discussed below.) For each obtained link, this iterative processing comprises executing Blocks 125-135. In Block 125, the target of the link is obtained. Suppose, for example, that the first of the "order"-as-source links identifies a target of the link as a "shipOrder" operation (indicating that the "order" operation invokes the "shipOrder" operation). Block 130 then gets all links where this operation (i.e., the "shipOrder" operation, in this example) is the source of the link. Block 135 then begins an iterative process whereby all of these links are processed. This iterative processing comprises executing Blocks 125-135 in a recursive manner.

When the processing of Blocks 125-135 completes for the current operation (i.e., the "order" operation, in the example), control reaches Block 140. Block 140 obtains all links where this operation is the target (if any). Suppose that the "order" operation is the target for a single link. Block 140 obtains this single link.

Block 145 indicates that an iterative process is performed on the link(s) obtained at Block 140. (If no links were found, then this operation may be the first operation in a message flow; processing then continues at Block 105, as discussed below.) For each obtained link, this iterative processing comprises executing Blocks 150-160. In Block 150, the source of the link is obtained. Suppose, for example, that the single "order"-as-target link identifies a source of the link as a "customerOrder" operation (indicating that the "customerOrder" operation invokes the "order" operation). Block 155 then gets all links where this operation (i.e., the "customerOrder" operation, in this example) is the target of the link. Block 160 then begins an iterative process whereby all of these links are processed. This iterative processing comprises executing Blocks 150-160 in a recursive manner.

When the processing of Blocks 150-160 completes for the current operation (i.e., the "order" operation, in the example), control returns to Block 105 to begin the iterative processing of another of the operations. As stated earlier, if there are no more operations to process, then control exits from FIG. 1.

The nodes and links found by the processing of FIG. 1 are added to a result set for displaying to an end user. FIG. 2 shows a sample result set display which corresponds to the example nodes and links which were discussed with reference to FIG. 1. As shown therein, a node 200 represents an aggregation of all observed instances of the "customerOrder" operation, and link 205 indicates that a single outbound invocation was found having this operation as its source, where the target of that link is the "order" operation represented by node 210. Node 210 represents an aggregation of all observed instances of that "order" operation. Similarly, node 220 represents an aggregation of all observed instances of the "shipOrder" operation and node 230 represents an aggregation of all observed instances of the "processPayment" operation.

With reference to this sample result set, it may happen that the observed instances of the "order" operation execute on many different application servers, and the instances of the "shipOrder" operation might execute on still other application servers; furthermore, when processing a particular customer order, the "order" operation may execute on one application server while the "shipOrder" operation executes on a different application server. Rather than trying to illustrate each path taken by the service operation invocations in this order processing, and each application server encountered in each of those paths, an embodiment of the present invention enables the user to see the relationships among the service operations in an aggregated view. For paths that involve many service operation instances executing on many different application servers, this aggregated approach is more likely to be understandable to the user.

While rectangles are shown in FIG. 2 for representing each aggregated service operation, it will be obvious that other graphical symbols may be used alternatively. FIG. 3 shows one alternative, where gear symbols are used instead of rectangles. As will also be obvious, a particular SOA solution may have many more than 4 distinct operations, and thus it will be understood that the example in FIGS. 2 and 3 is by way of illustration only.

A markup language document, such as an Extensible Markup Language or "XML" document, may be used for recording information about nodes and links. In one approach, a globally-unique identifier ("GUID") or other type of unique identifier is created for distinguishing among each of the nodes, and an identifier for each of the links is constructed by concatenating the GUIDs of the source and target nodes of that link. An example XML document 400 is shown in FIG. 4. This XML document 400 corresponds to the SOA solution illustrated in FIGS. 2 and 3, as will now be described.

In document 400, a <graph> element is defined, comprising 4 <node> elements and 3 <link> elements. (Document 400 also includes various namespace or "xmlns" definitions, the meaning of which is well known and which will therefore not be described herein.) The first <node> element 410, in this example, corresponds to the "order" operation shown at 210 in FIG. 2. The <node> elements 420, 430, 440 correspond, in this example, to the operations at 200, 220, and 230, respectively. The first <link> element 450 corresponds to link 215 in FIG. 2. Note that the value of the <source> element 452 matches the value of the "guid" attribute 411 of the <node> element 410, and the value of the <target> element 453 matches the value of the "guid" attribute 431 of the <node> element 430. Note also that the value of the "guid" attribute 451 in <link> element 450 comprises a concatenation of the values of <source> element 452 and <target> element 453. (Unique identifiers for nodes and links may be constructed in other ways without deviating from the scope of the present invention.)

Using information such as that recorded in document 400 and the logic of FIG. 1, the aggregated view shown in FIG. 2 or FIG. 3 can be constructed and displayed to the user.

The <node> syntax in FIG. 4 illustrates a "nodeType" attribute having value "OpAgg". This indicates, according to this example, that the node represents an aggregation for a service operation. Each <node> element further comprises a <label> child element (see reference number 412), and the value specified therein may be used as the label or text of the associated display element. The <node> elements in FIG. 4 also illustrate use of an <OpAgg> child element (see reference number 413) in which various values may be recorded. This information may pertain to the machines on which the service operation is hosted. For example, it may happen that degradation of a system entity or entities pertaining to a service operation or hosting application server is detected, and a value may therefore be set for a "degraded" attribute. An "index" attribute may be used, as discussed in more detail in the related application. An "instances" attribute may be used to store a count of the number of instances that were observed for the service operation, where these instances were aggregated to create a particular <node> element. A "situations" attribute may be used to indicate whether any situations or conditions exist, relative to this service operation, that should be called to the attention of the user (for example, by displaying a graphical indicator associated with the icon for this particular node). A "status" attribute may also be used, where this attribute may be set to indicate whether the instances of the service operation are operating normally.

The <link> syntax in FIG. 4 illustrates a "linkType" attribute having value "callPath". This indicates, according to this example, that the link represents a path between two service operations. Each <link> element further comprises, in addition to the above-described <source> 452 and <target> 453 child elements, a <callpath> child element (see reference number 454) in which various values may be recorded. This information may provide metrics pertaining to the invocations of the service operation. For example, this <callpath> element may record information about the average, minimum, and maximum length of time involved when invoking the called service operation.

Various other child elements and/or attributes may be recorded for <node> and <link> elements, in addition to or instead of the examples shown in FIG. 4, without deviating from the scope of the present invention.

Referring now to FIGS. 5-8, sample data is provided that further illustrates operation of the logic of FIG. 1. As shown in FIG. 5, a collection of raw data 500 corresponding to service operations is obtained. This raw data is preferably collected by agent processes or other message intercept points, as noted earlier (and the manner in which these agent processes operate to gather such information does not form part of the inventive concepts disclosed herein). In its original form, raw data 500 may be distributed among various storage repositories (including one or more databases). Within such storage repositories, the data may be stored as discrete pieces of information. For example, rather than the information shown at 502, 522, a discrete piece of information might be stored such as "Operation A was observed executing on machine 1", and this might be combined with another discrete piece of information indicating "a message went from Operation A on machine 1 to Operation B on machine 2". Accordingly, the raw data collection 500 may represent a concatenation of discrete pieces of information and is provided by way of illustration and not of limitation. (Furthermore, additional information may be stored in association with these discrete pieces of information. Machine-specific information used in creating the <OpAgg> element illustrated at reference number 413 in FIG. 4 might be stored in association with the nodes, and various metrics used in creating the <callpath> element illustrated at reference number 454 in FIG. 4 might be stored in association with the links.)

By programmatically inspecting raw data 500, it can be determined in this example that the unique service operations referenced therein comprise 10 different operations having sample names "Operation A" through "Operation J". Accordingly, Block 100 of FIG. 1 creates 10 nodes, each of which represents one of these operations. In one embodiment, a <node> element as illustrated in FIG. 4 is created for each of these 10 aggregations. The "calls" syntax illustrated in raw data 500 may be parsed to determine the links between various ones of these 10 service operations, and a <link> element as illustrated in FIG. 4 may be created for each such relationship. The "gets called from" syntax in raw data 500 (see reference numbers 501, 511) and the "is initiated" syntax (see reference number 541) represent, for this example syntax, the starting point of a call path. It may happen that some application servers are not monitored by agent processes. In such cases, the "gets called from" indication represents the known starting point of the call path, although this may actually correspond to an intermediate service operation invocation within a call path.

Figure 6:
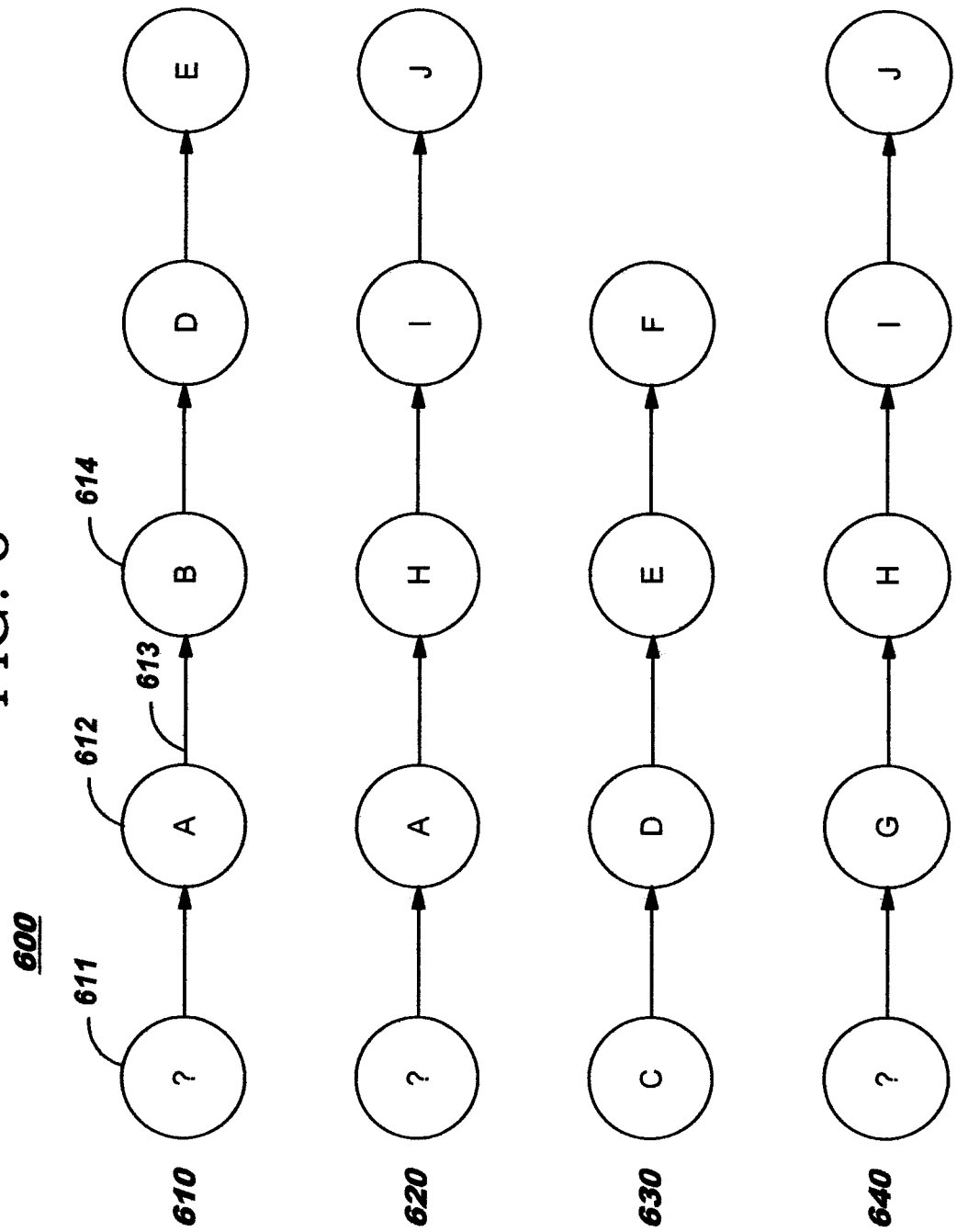

FIG. 6 graphically illustrates the nodes and relationships between those nodes, as represented by raw data 500 of FIG. 5. As can be seen therein, the relationships indicate that, without regard to the hosting application servers, 4 distinct calling paths 600, 610, 620, 630 have been observed. In this diagram 600, the "?" in the first node in 3 of the 4 paths indicates that the caller of the first identified operation is not known. For example, the "?" in node 611 of path 610 indicates that the caller of Operation A (represented in node 612) is not known.

The node A at reference number 612 represents an aggregation of instances of Operation A, as noted earlier with reference to Block 100 of FIG. 1. In the sample raw data 500, Operation A calls Operation B in 4 of the observed call paths. See reference numbers 502, 512, 522, 532. Of these 4 invocations, Operation A is executing on machine 1 for 2 of those invocations (see reference numbers 502, 522) and on machine 4 for the remaining 2 invocations (see reference numbers 512, 532). By aggregating these 4 calls into a single call path 613 between node A 612 and node B 614, as disclosed herein, a visual depiction of the operation of the SOA solution corresponding to raw data 500 can be simplified.

By contrast to using the aggregation of service operations represented in diagram 600, if a separate calling path was created each time the hosting application server was distinct, then 6 different calling paths would result from the 7 sets of information 501, 511, 521, 531, 541, 551, 561 found in raw data 500 (where the information at 501 and 521 uses the same call relationships among service operations hosted on the same application servers).

Figure 7:
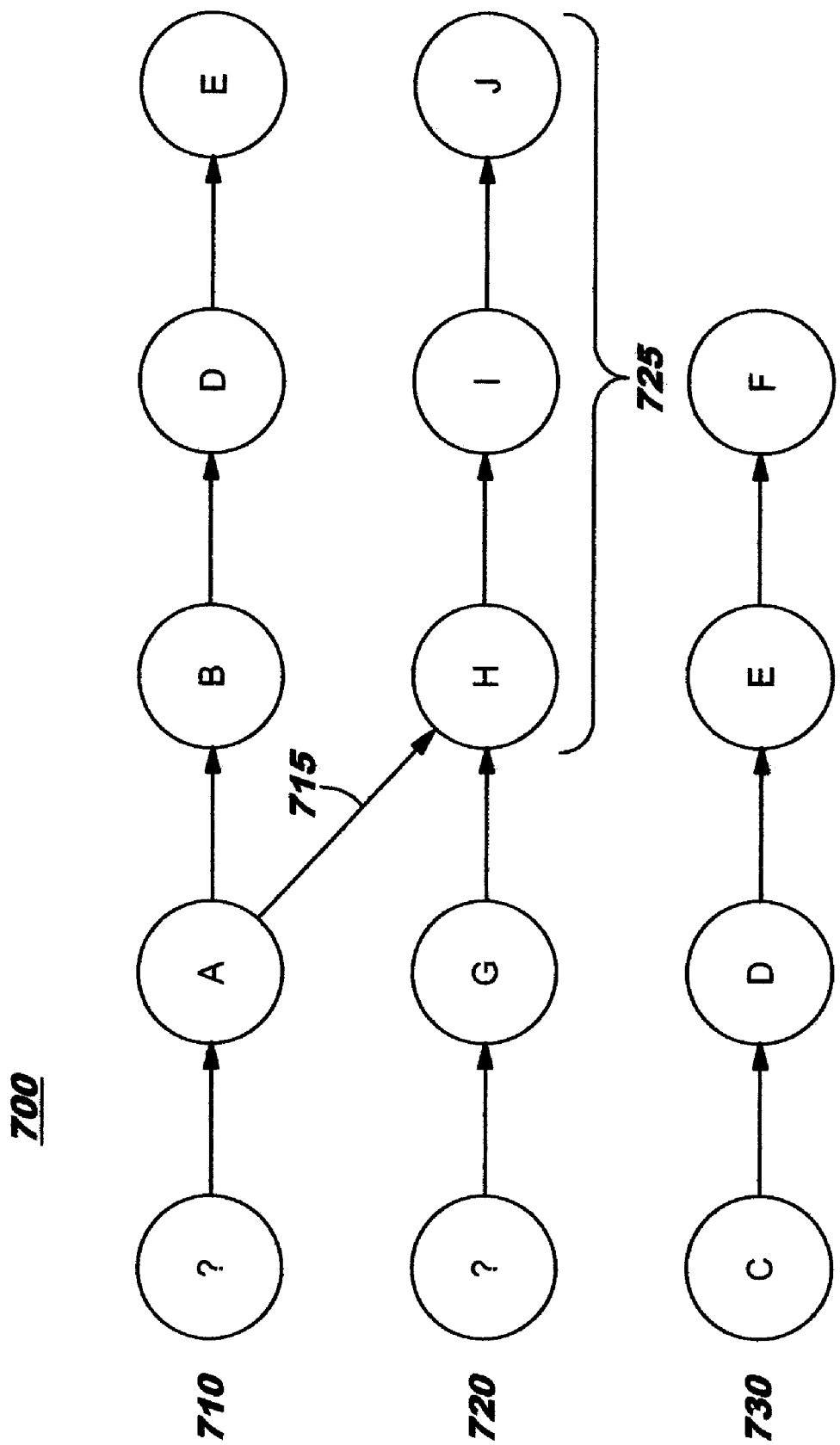
Figure 8:
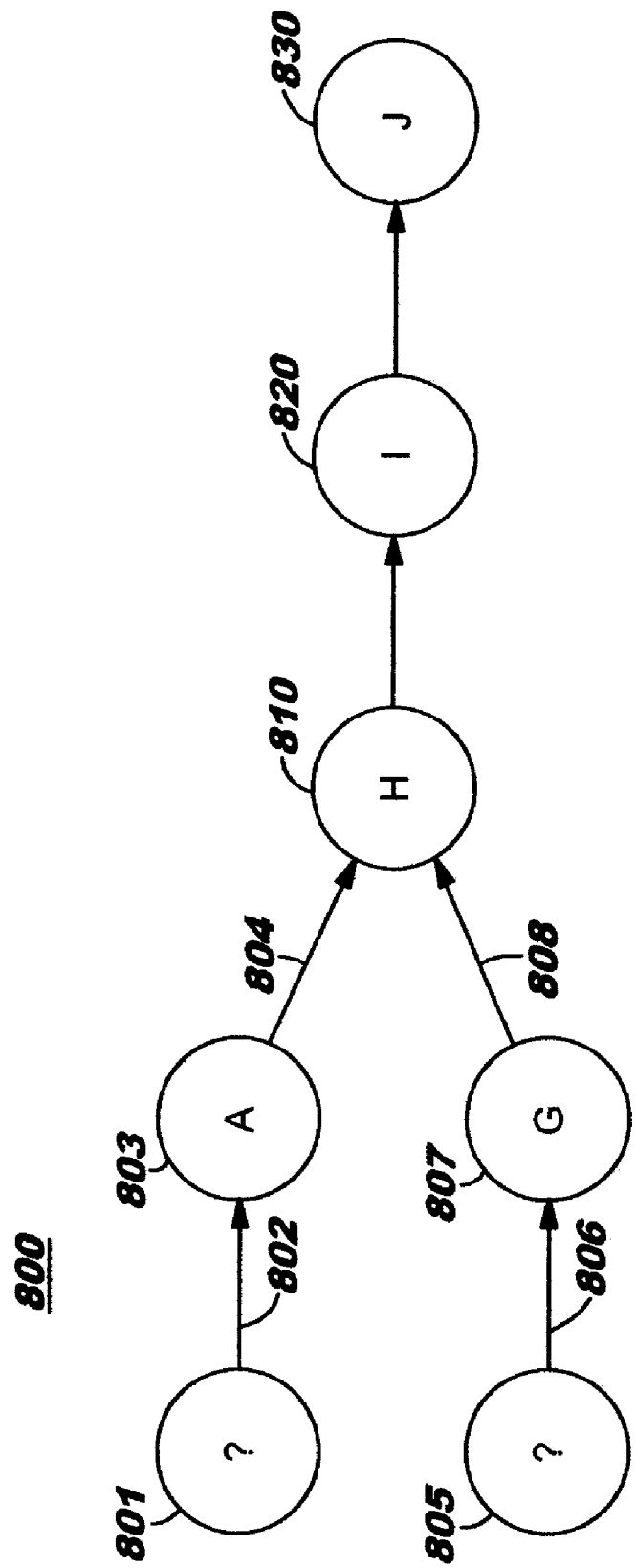

FIG. 7 shows an alternative diagram 700 that may be created from raw data 500 by organizing the data according to flows instead of operations. In this example, calling path 630 from the operation aggregation represented in FIG. 6 is unchanged, when organized by flows, into flow 730. Callings paths 610 and 640 from FIG. 6 correspond to flows 710 and 720 of FIG. 7, respectively. Arrow 715 in FIG. 7 indicates that an interaction is detected whereby the subgraph 725 occurs in calling path 620 as well as in calling path 640. Accordingly, diagram 700 presents a compacted view of the relationships among the nodes, and the service operations which they represent, as compared to diagram 600.

An embodiment of the present invention may facilitate drill-down processing that enables a user to perform further investigation, if desired. This is represented pictorially by diagram 800 in FIG. 8, where the user in this example may have chosen to view more information pertaining to operation H. Diagram 800 thus enables the user to see a representation of upstream and downstream resources that could impact, or be impacted by, the processing of the service operation instances aggregated at node H 810. For example, if service degradation is detected at node H, the user can drill down to diagram 800 and see that this may be a result of poor performance of some unknown invoking operation 801, 805; a known invoking operation A 803 or G 807; or perhaps congestion on communication links 802, 804, 806, or 808 between service invocations. Similarly, diagram 800 enables the user to see that a service degradation at node H 810 may cause subsequent degradation (such as missed turnaround-time commitments) at service operations corresponding to node I 820 and/or node J 830. The user may choose to navigate among the potentially numerous instances of service operation H, if desired. (The actual impact of service degradation, or cause thereof, is not material to an embodiment of the present invention.)

Figure 9:
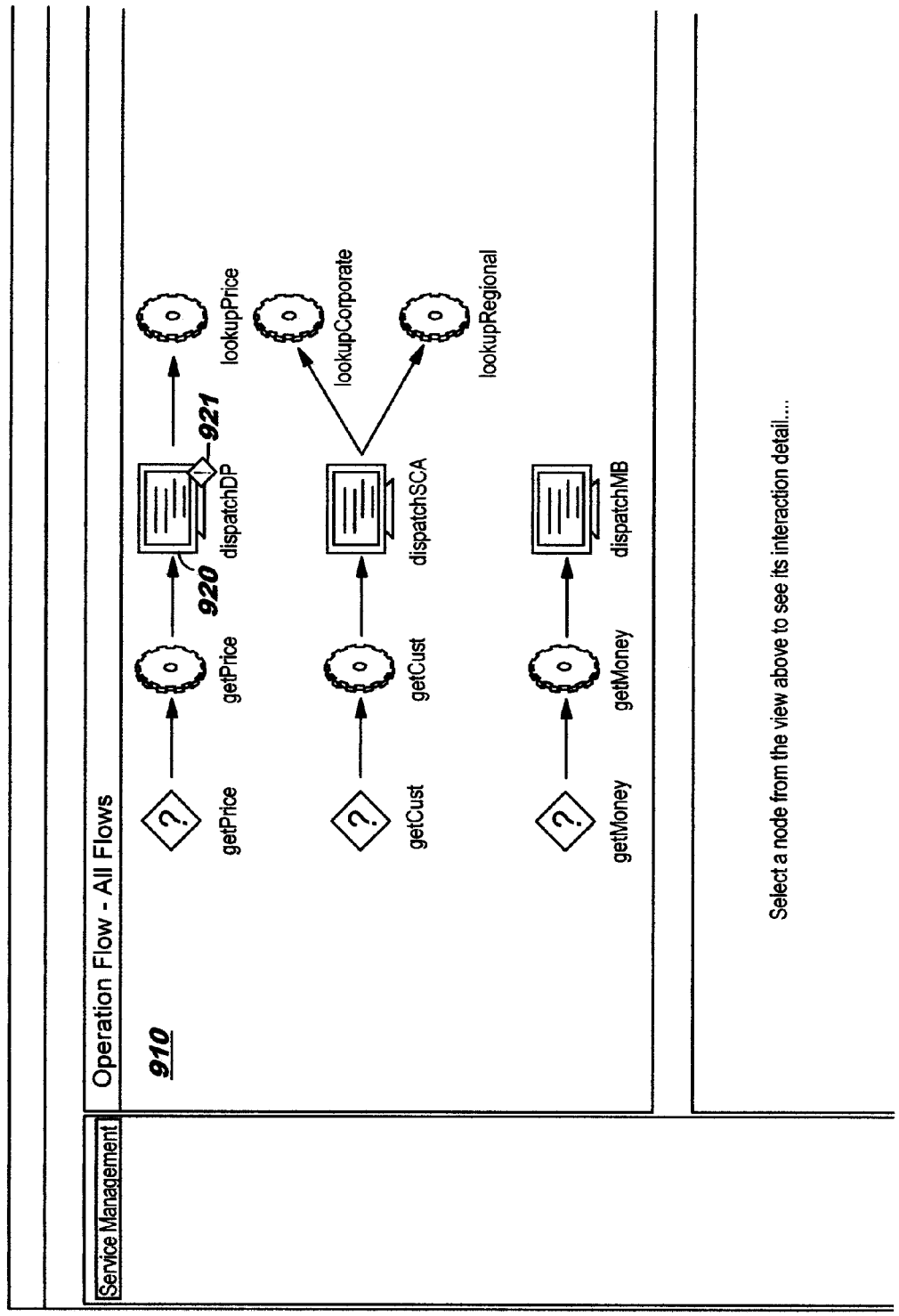
FIGS. 9-13 provide views to illustrate service operation invocations in a sample SOA solution environment.

Referring now to FIGS. 9-13, views are presented to illustrate service operation invocations in another sample SOA solution environment. In FIG. 9, an upper topology view 910 shows 3 distinct flows of the environment. These 3 flows provide an aggregated view, whereby the user can see all interactions (and therefore all dependencies) among the service operations for a dynamic, as-observed view of this particular SOA solution. Problem areas may be highlighted. In this sample view 910, a diamond shape is presented at 921 to indicate that at least one deployed instance of a service operation "dispatchDP" represented by icon 920 is experiencing some degraded status (or, alternatively, that the monitoring agent for the instance is not currently operable). While not depicted in this example, metrics may be provided on the links to represent statistics pertaining to the invocations among services, and the icons associated with the services may be visually distinguished to indicate those service operations for which the icon represents an aggregation of multiple instances of the service operations.

Figure 10:
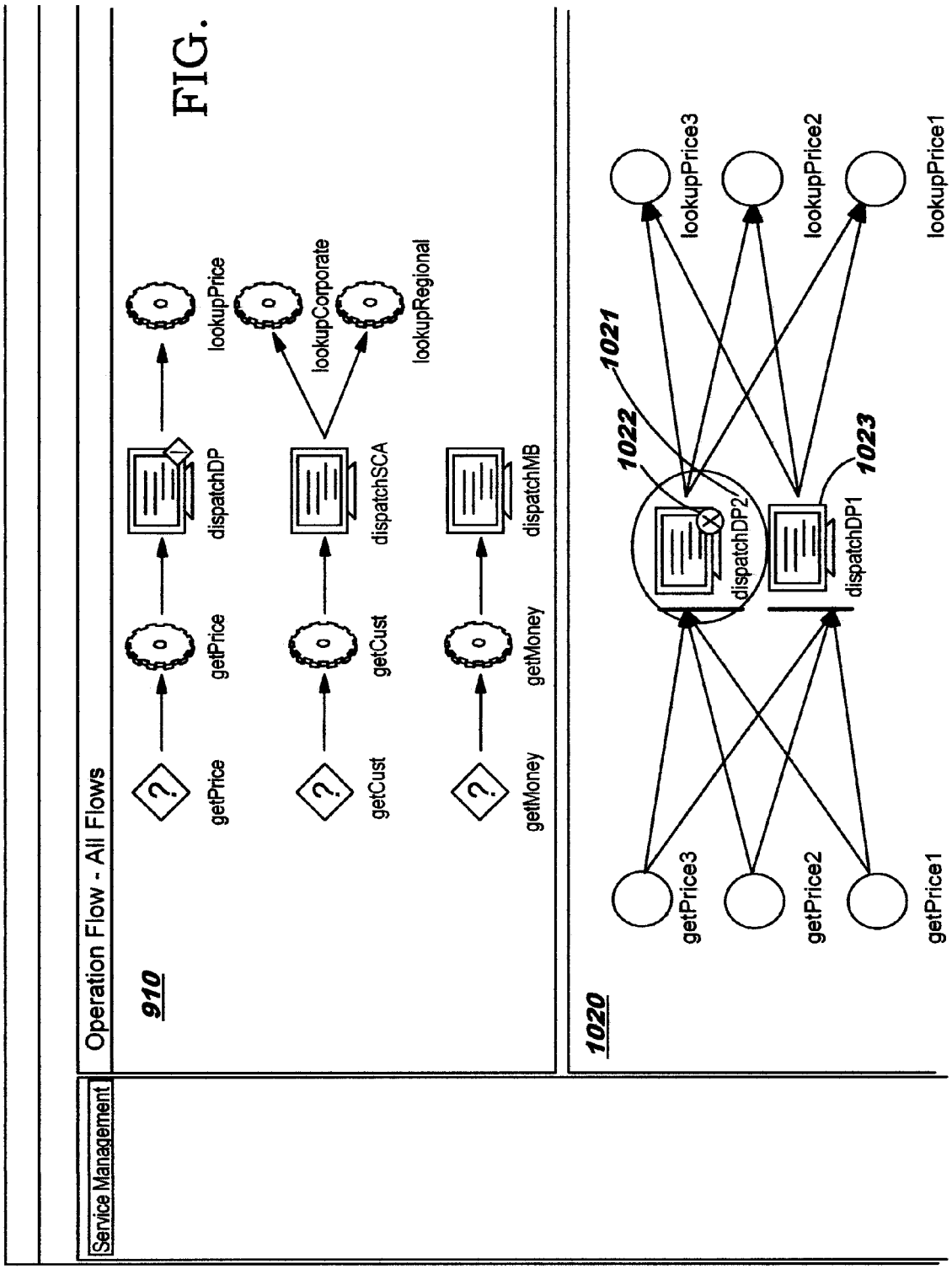

Responsive to the user double-clicking (or otherwise selecting) icon 920, a drill-down view with expanded information corresponding to the service operation may be presented as shown at 1020 of FIG. 10. The user can thus see the deployed, observed instances of that service operation and can see a closer view of the service operations with which those instances are interacting. View 1020 provides, in this example, a "one-hop view" comprising all callers of each instance of the "dispatchDP" operation and all operations called by each instance of "dispatchDP". (The calling operations are shown on the left and the called operations are shown on the right, in this view 1020.) In this example, a first deployed instance "dispatchDP1" 1023 is illustrated, which has no "problem" graphic associated therewith, while a second deployed instance "dispatchDP2" 1021 is illustrated with an associated "problem" graphic 1022.

The drill-down approach illustrated by view 1020 facilitates deployment-level analysis and problem determination. At the same time, the upper view 910 establishes and maintains an overall context, facilitates the drill-down and navigation among instances in detailed view 1020, and conveys an overall view of possible performance impacts.

Figure 11:
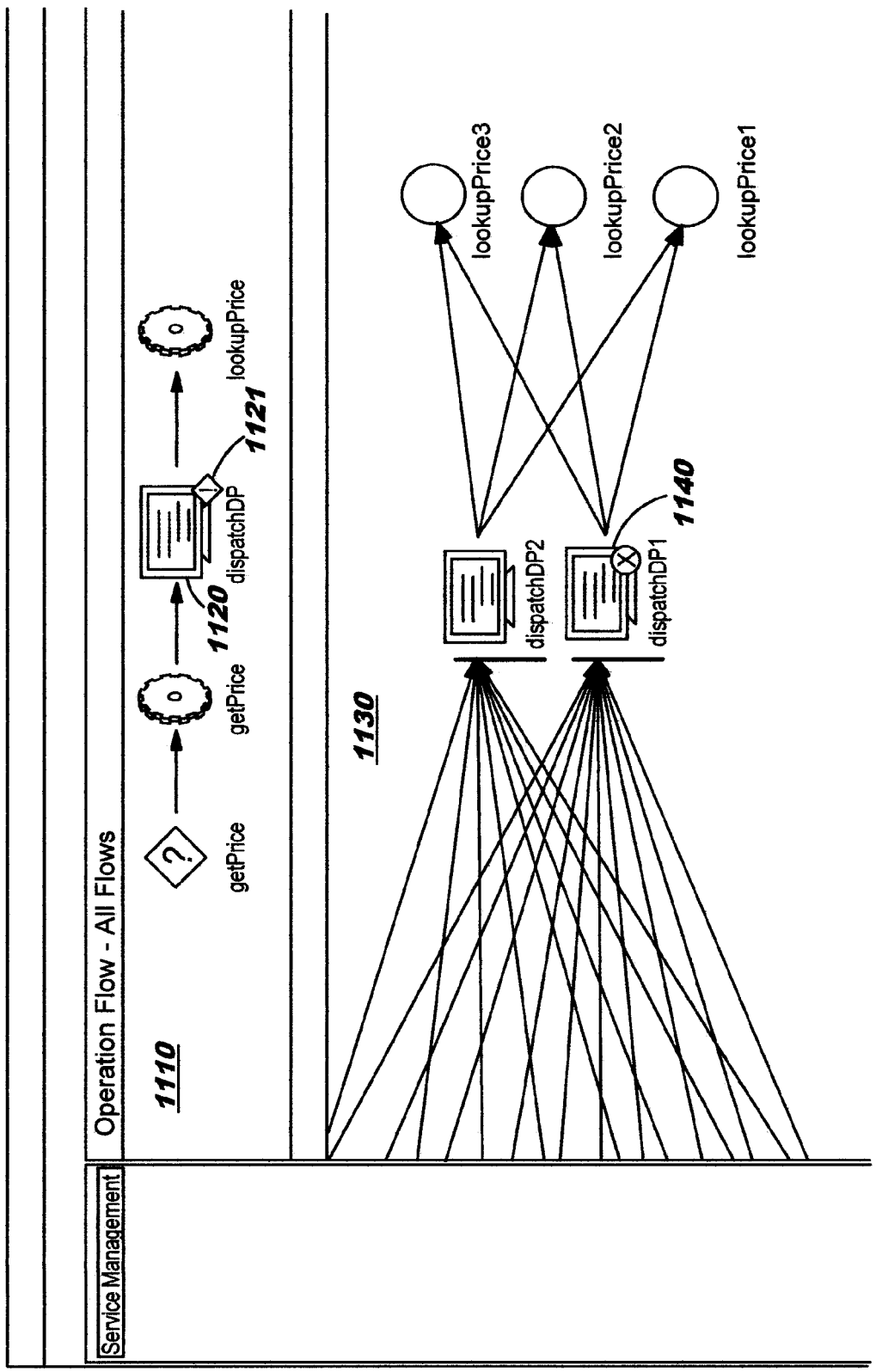

FIG. 11 provides an alternative view, where a single one of the flows from FIG. 9 is shown in the upper topology view 1110. In this example, this is the flow which is experiencing some type of situation needing attention of the user, as indicated by the diamond shape at 1121. The drill-down view at 1130 illustrates 2 instances of the service operation which are represented, as an aggregation, by icon 1120. The user can therefore see the specific instance 1140 the situation is associated with, and the service flows using that instance (as seen by the 1-hop flows entering, or calling, instance 1140 and the 1-hop flows exiting, or called by, instance 1140). The in-context, as-observed view of the SOA solution as provided in FIG. 11 enables the user to see details pertaining to the situation at 1120, 1140 in support of triage and problem determination. (Note that identifiers of the callers may be shown in drill-down view 1130, although for ease of illustration, this has not been shown in FIG. 11.)

Figure 12:
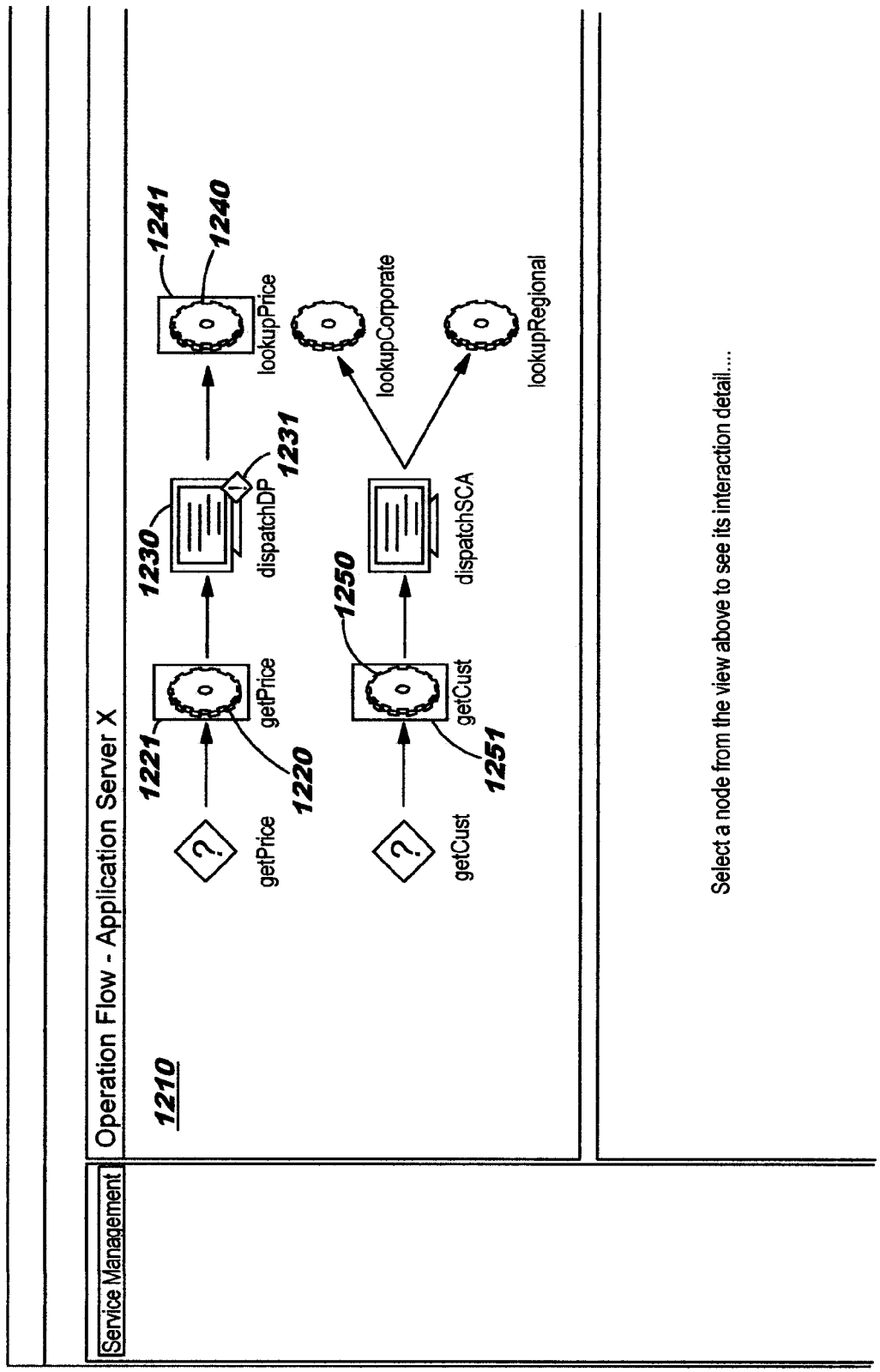

FIG. 12 illustrates another view, where the user can see message flows of the SOA solution and where a visual emphasis or highlighting is depicted in topology view 1210 for those flows passing through a particular application server (referred to in the caption of the figure as "Application Server X"). In this illustration, the highlighting comprises placing an outline around selected icons corresponding to flows through the particular application sever The application server of interest may be selected, in one approach, from a drop-down list (not illustrated in FIG. 12). The diamond shape at 1231 indicates, in this example, that a problem situation exists for an operation 1230, and the highlighting at 1221 shows that this operation 1230 is invoked by at least one instance of an operation 1220 that is hosted on the application server of interest; similarly, the highlighting at 1241 shows that the operation 1230 invokes at least one instance of an operation 1240 that is hosted on the application server of interest. Problems flagged by 1231 may therefore lead to problems with operation 1240 (such as failure to meet response-time commitments), and/or they may be caused by other problems or degradation with operation 1220. The highlighting at 1251 indicates that at least one instance of operation 1250 is hosted on the application server of interest. The view in FIG. 12 allows a user to quickly understand dependencies of the SOA solution on an individual application server and to understand implications of problems with that application server on the overall SOA solution.

Figure 13:
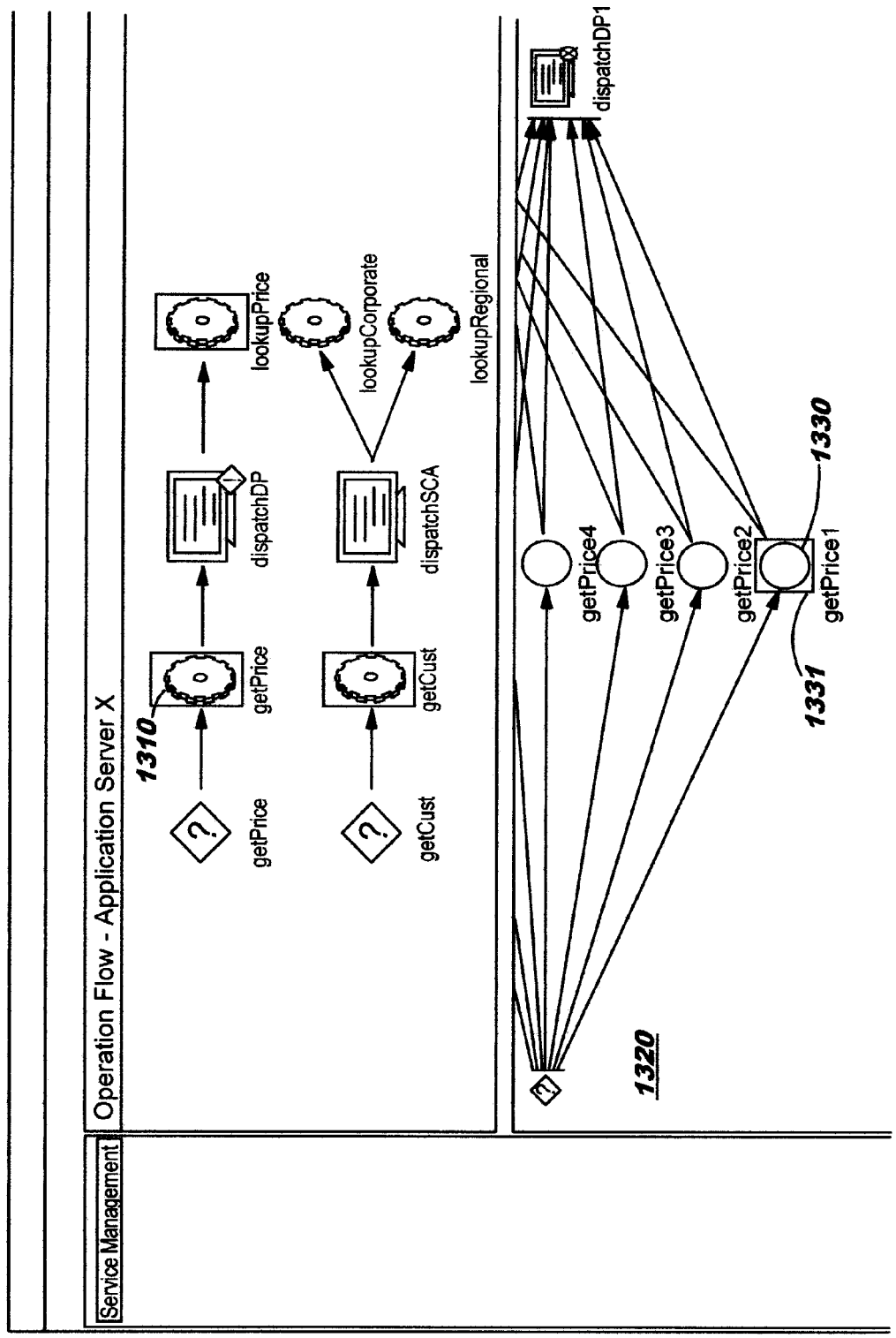

FIG. 13 illustrates a result of the user double-clicking (or otherwise selecting) an aggregate icon from FIG. 12 that represents one or more instances which are deployed on the application server of interest. In this example, the user has double-clicked on icon 1310 (which was shown using reference number 1220 in FIG. 12; in an actual implementation of the present invention, a distinct visual highlighting is preferably provided to show the selection of icon 1310, although the outline surrounding icon 1310 corresponds, in this figure, to the above-described highlighting 1221). In response, the drill-down view 1320 is presented, showing flows in to and out of a number of instances of the service operation for which icon 1310 presents an aggregated view. In this example, visual highlighting depicted as an outline 1331 is placed around icon 1330 to indicate that this particular instance 1330 is deployed on the application server of interest.

The in-context, as-observed presentation enabled by an embodiment of the present invention provides information usable for system administrators or other users as they perform triage, impact analysis, and/or causal analysis in support of operational SOA solutions. Various high-level views of this information may be shown to a user and drill-down operations may be supported for obtaining further details (e.g., as illustrated in the topology views of FIGS. 9-13).

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. In a hardware embodiment, specialized or dedicated circuitry may be provided that carries out functions described herein. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 14:
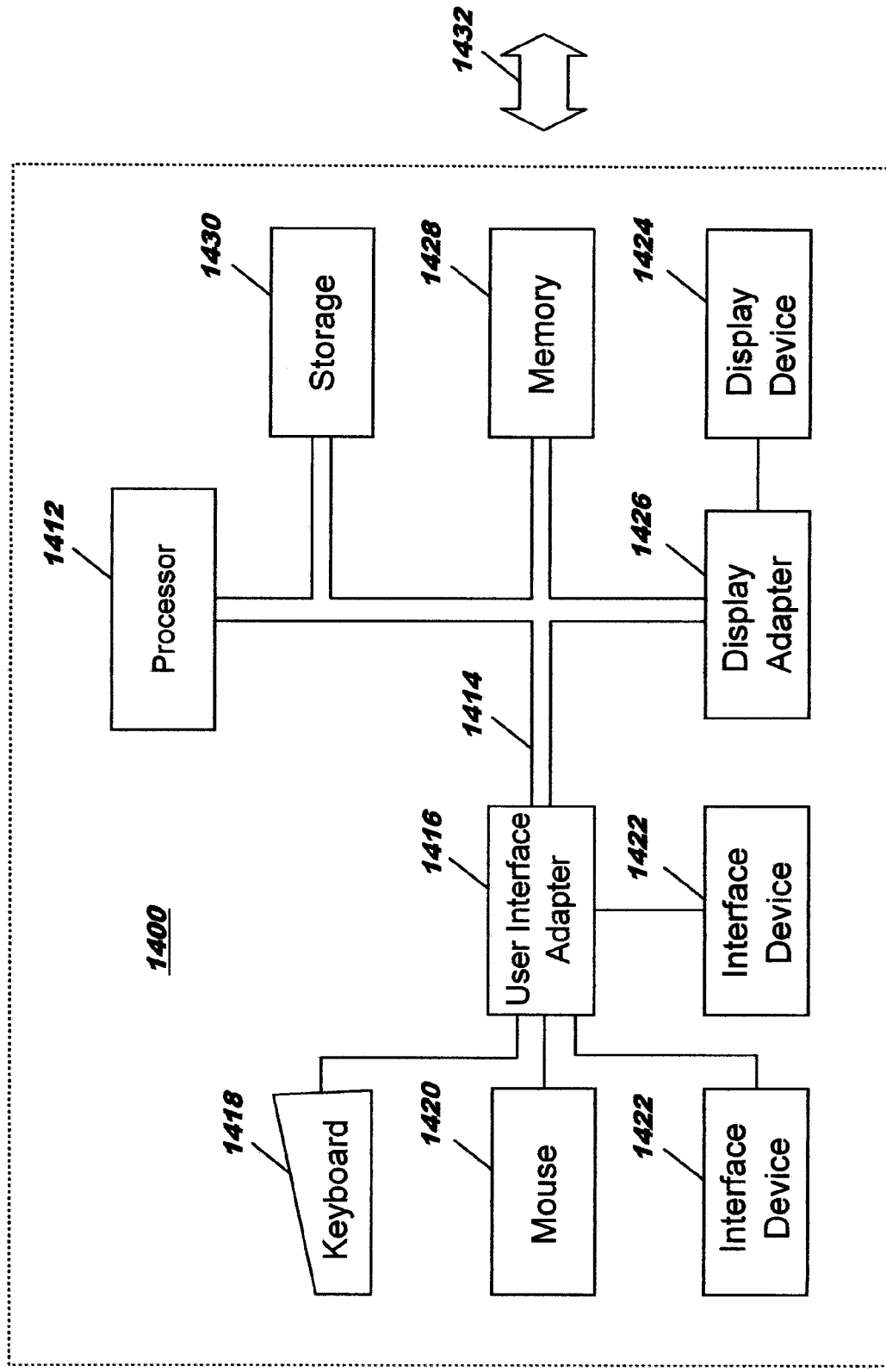
FIG. 14 depicts a data processing system suitable for storing and/or executing program code.

Referring now to FIG. 14, a data processing system 1400 suitable for storing and/or executing program code includes at least one processor 1412 coupled directly or indirectly to memory elements through a system bus 1414. The memory elements can include local memory 1428 employed during actual execution of the program code, bulk storage 1430, and cache memories (not shown) which provide temporary storage of at least some program code in order to reduce the number of times code must be retrieved from bulk storage during execution.

Input/output ("I/O") devices (including but not limited to keyboards 1418, displays 1424, pointing devices 1420, other interface devices 1422, etc.) can be coupled to the system either directly or through intervening I/O controllers or adapters (1416, 1426).

Network adapters may also be coupled to the system to enable the data processing system to become coupled to other data processing systems or remote printers or storage devices through intervening private or public networks (as shown generally at 1432). Modems, cable modem attachments, wireless adapters, and Ethernet cards are just a few of the currently-available types of network adapters.

Figure 15:
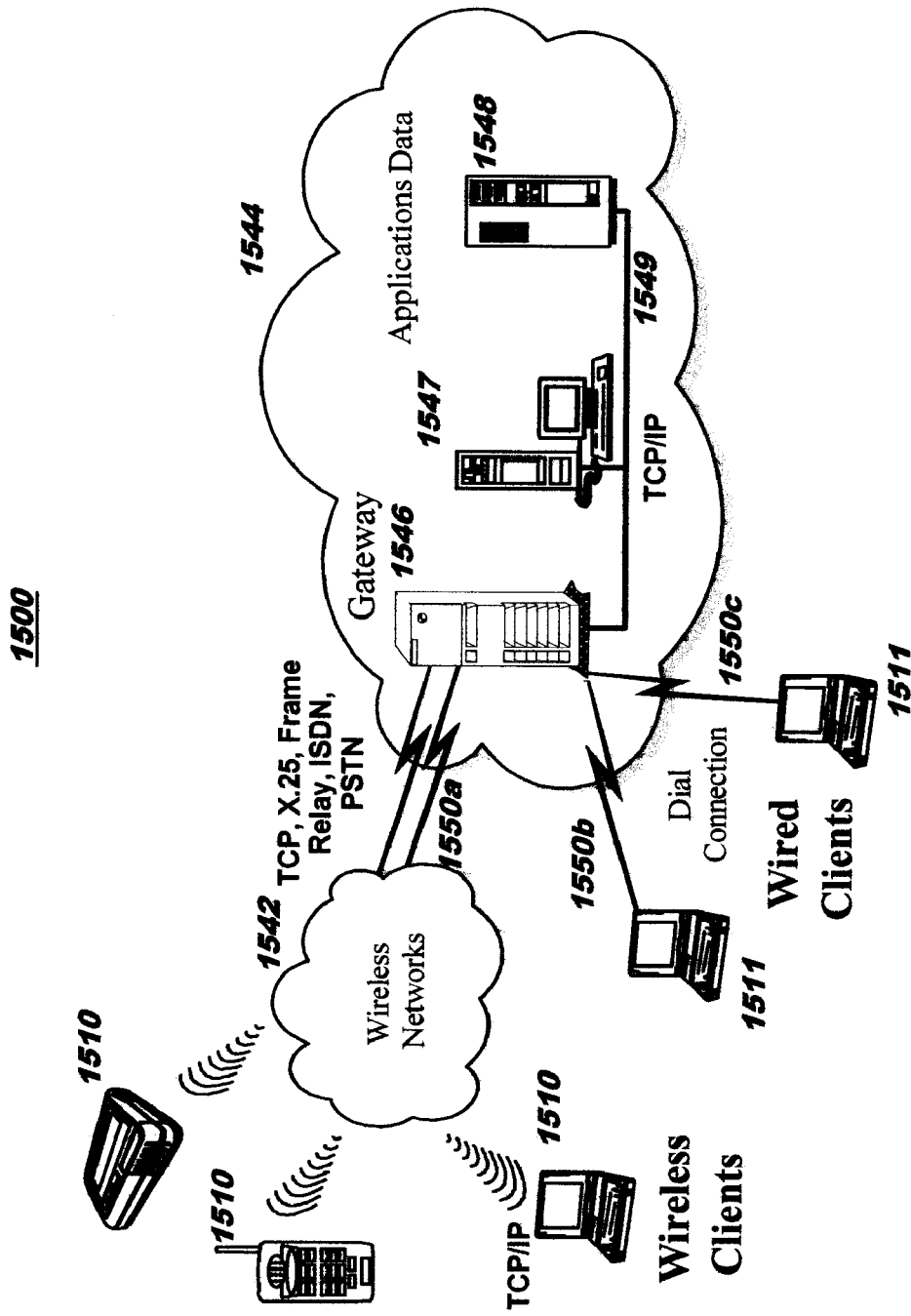
FIG. 15 depicts a representative networking environment in which one or more embodiments of the present invention may be used.

FIG. 15 illustrates a data processing network environment 1500 in which the present invention may be practiced. The data processing network 1500 may include a plurality of individual networks, such as wireless network 1542 and network 1544. A plurality of wireless devices 1510 may communicate over wireless network 1542, and a plurality of wired devices, shown in the figure (by way of illustration) as workstations 1511, may communicate over network 1544. Additionally, as those skilled in the art will appreciate, one or more local area networks ("LANs") may be included (not shown), where a LAN may comprise a plurality of devices coupled to a host processor.

Still referring to FIG. 15, the networks 1542 and 1544 may also include mainframe computers or servers, such as a gateway computer 1546 or application server 1547 (which may access a data repository 1548). A gateway computer 1546 serves as a point of entry into each network, such as network 1544. The gateway 1546 may be preferably coupled to another network 1542 by means of a communications link 1550a. The gateway 1546 may also be directly coupled to one or more workstations 1511 using a communications link 1550b, 1550c, and/or may be indirectly coupled to such devices. The gateway computer 1546 may be implemented utilizing an Enterprise Systems Architecture/390® computer available from IBM. Depending on the application, a midrange computer, such as an Application System/400® (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 1546 may also be coupled 1549 to a storage device (such as data repository 1548).

Those skilled in the art will appreciate that the gateway computer 1546 may be located a great geographic distance from the network 1542, and similarly, the wireless devices 1510 and/or workstations 1511 may be located some distance from the networks 1542 and 1544, respectively. For example, the network 1542 may be located in California, while the gateway 1546 may be located in Texas, and one or more of the workstations 1511 may be located in Florida. The wireless devices 1510 may connect to the wireless network 1542 using a networking protocol such as the Transmission Control Protocol/Internet Protocol ("TCP/IP") over a number of alternative connection media, such as cellular phone, radio frequency networks, satellite networks, etc. The wireless network 1542 preferably connects to the gateway 1546 using a network connection 1550a such as TCP or User Datagram Protocol ("UDP") over IP, X.25, Frame Relay, Integrated Services Digital Network ("ISDN"), Public Switched Telephone Network ("PSTN"), etc. The workstations 1511 may connect directly to the gateway 1546 using dial connections 1550b or 1550c. Further, the wireless network 1542 and network 1544 may connect to one or more other networks (not shown), in an analogous manner to that depicted in FIG. 15.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention. Furthermore, while the discussion herein may refer to "an embodiment" or "one embodiment" of the present invention, such references are not necessarily discussing the same embodiment.

The invention claimed is:

1. A computer-implemented method for displaying service operations in a service-oriented architecture ("SOA") environment, comprising:
   determining, for a plurality of service operations comprising an SOA solution in the SOA environment, each selected one of the plurality of service operations for which at least one observed instance thereof has been executed;
   creating, for each of the selected service operations, a single node to represent all of the executed observed instances of the service operation and storing, in association with the single node, an aggregation of information from all of the executed observed instances of the service operation, wherein:
   at least one particular one of the created nodes represents one of the selected service operations for which at least two observed instances have been executed; and
   at least one of the at least one particular one of the created nodes represents a service operation for which the observed instances executed at different application servers in the SOA environment;
   determining each of a plurality of calls that occurred between the executed observed instances, each of the calls comprising a calling one of the selected service operations and a called one of the selected service operations;
   creating, for each distinct combination of calling one and called one in the determined calls, a single link to represent the distinct combination and storing, in association with the single link, an aggregation of information from all of the determined calls that occurred between the calling one and the called one; and
   displaying on a user interface, using the created nodes and links, at least one call relationship among the selected service operations, wherein:
   each displayed call relationship comprises a graphical representation corresponding to a first one of the created nodes and a second one of the created nodes and a link therebetween, the link therebetween corresponding to the single one of the links that represents the distinct combination in which the calling one comprises a first of the selected service operations which is represented by the first one of the created nodes and in which the called one comprises a second of the selected service operations which is represented by the second one of the created nodes and, in a recursive manner, a graphical representation corresponding to additional ones of the created nodes and links therebetween, the links therebetween corresponding to any ones of the single links that represent the distinct combination in which either the called one or the calling one comprises either the first or the second of the selected service operations;
   the graphical representation corresponding to each of the created nodes is selectable from the user interface and further comprising, responsive to selecting one of the selectable graphical representations, displaying a drill-down view comprising a graphical representation of each of the observed instances of the service operation represented by the corresponding node; and
   the drill-down view further comprises, for at least one of the graphical links between the graphical representation of the corresponding node and the graphical representation of a different one of the nodes, a graphical representation of each of the observed instances of the service operation represented by the different node and a graphical representation of links between calling and called ones of the observed instances of the service operation represented by the corresponding node and the observed instances of the service operation represented by the different one of the nodes.

2. The method according to claim 1, further comprising persisting each of the created nodes and each of the created links as elements in a markup language document.

3. The method according to claim 2, wherein the element for each of the created links comprises an identification of the calling one of the selected service operations which is represented by the link and an identification of the called one of the service operations which is represented by the link.

4. The method according to claim 1, further comprising: identifying each of the created links using a unique identifier, the unique identifier created by concatenating a second unique identifier to a first unique identifier, the first unique identifier identifying a calling one of the selected service operations represented by the link and the second unique identifier identifying a called one of the selected service operations represented by the link.

5. The method according to claim 1, wherein the aggregated information from all of the executed observed instances and the aggregated information from all of the determined calls is obtained by a monitoring agent operating at each of at least one application servers which are operable in the SOA environment.

6. The method according to claim 1, wherein at least a subset of the observed instances correspond to a particular application server executing at least one of the plurality of service operations.

7. The method according to claim 1, wherein the observed instances correspond to a particular context within the SOA environment.

8. The method according to claim 7, wherein the particular context corresponds to the selected ones of the plurality of service operations.

9. The method according to claim 7, wherein the particular context corresponds to a particular application server executing at least one of the plurality of service operations.

10. A system for displaying service operations in a service-oriented architecture ("SOA") environment, comprising:
   a computer comprising a processor; and
   instructions which execute, using the processor, to implement functions comprising:

determining, for a plurality of service operations comprising an SOA solution in the SOA environment, each selected one of the plurality of service operations for which at least one observed instance thereof has been executed;

creating, for each of the selected service operations, a single node to represent all of the executed observed instances of the service operation and storing, in association with the single node, an aggregation of information from all of the executed observed instances of the service operation, wherein:

at least one particular one of the created nodes represents one of the selected service operations for which at least two observed instances have been executed; and at least one of the at least one particular one of the created nodes represents a service operation for which the observed instances executed at different application servers in the SOA environment;

determining each of a plurality of calls that occurred between the executed observed instances, each of the calls comprising a calling one of the selected service operations and a called one of the selected service operations;

creating, for each distinct combination of calling one and called one in the determined calls, a single link to represent the distinct combination and storing, in association with the single link, an aggregation of information from all of the determined calls that occurred between the calling one and the called one; and displaying on a user interface, using the created nodes and links, at least one call relationship among the selected service operations, wherein:

each displayed call relationship comprises a graphical representation corresponding to a first one of the created nodes and a second one of the created nodes and a link therebetween, the link therebetween corresponding to the single one of the links that represents the distinct combination in which the calling one comprises a first of the selected service operations which is represented by the first one of the created nodes and in which the called one comprises a second of the selected service operations which is represented by the second one of the created nodes and, in a recursive manner, a graphical representation corresponding to additional ones of the created nodes and links therebetween, the links therebetween corresponding to any ones of the single links that represent the distinct combination in which either the called one or the calling one comprises either the first or the second of the selected service operations;

the graphical representation corresponding to each of the created nodes is selectable from the user interface and further comprising, responsive to selecting one of the selectable graphical representations, displaying a drill-down view comprising a graphical representation of each of the observed instances of the service operation represented by the corresponding node; and the drill-down view further comprises, for at least one of the graphical links between the graphical representation of the corresponding node and the graphical representation of a different one of the nodes, a graphical representation of each of the observed instances of the service operation represented by the different node and a graphical representation of links between calling and called ones of the observed instances of the service operation represented by the corresponding node and the observed instances of the service operation represented by the different one of the nodes.

11. A computer program product for displaying service operations in a service-oriented architecture ("SOA") environment, wherein the computer program product is embodied on one or more non-transitory computer-readable media and comprises computer-readable instructions for:

determining, for a plurality of service operations comprising an SOA solution in the SOA environment, each selected one of the plurality of service operations for which at least one observed instance thereof has been executed;

creating, for each of the selected service operations, a single node to represent all of the executed observed instances of the service operation and storing, in association with the single node, an aggregation of information from all of the executed observed instances of the service operation, wherein:

at least one particular one of the created nodes represents one of the selected service operations for which at least two observed instances have been executed; and at least one of the at least one particular one of the created nodes represents a service operation for which the observed instances executed at different application servers in the SOA environment;

determining each of a plurality of calls that occurred between the executed observed instances, each of the calls comprising a calling one of the selected service operations and a called one of the selected service operations;

creating, for each distinct combination of calling one and called one in the determined calls, a single link to represent the distinct combination and storing, in association with the single link, an aggregation of information from all of the determined calls that occurred between the calling one and the called one; and displaying on a user interface, using the created nodes and links, at least one call relationship among the selected service operations, wherein:

each displayed call relationship comprises a graphical representation corresponding to a first one of the created nodes and a second one of the created nodes and a link therebetween, the link therebetween corresponding to the single one of the links that represents the distinct combination in which the calling one comprises a first of the selected service operations which is represented by the first one of the created nodes and in which the called one comprises a second of the selected service operations which is represented by the second one of the created nodes and, in a recursive manner, a graphical representation corresponding to additional ones of the created nodes and links therebetween, the links therebetween corresponding to any ones of the single links that represent the distinct combination in which either the called one or the calling one comprises either the first or the second of the selected service operations;

the graphical representation corresponding to each of the created nodes is selectable from the user interface and further comprising, responsive to selecting one of the selectable graphical representations, displaying a drill-down view comprising a graphical representation of each of the observed instances of the service operation represented by the corresponding node; and the drill-down view further comprises, for at least one of the graphical links between the graphical representation of the corresponding node and the graphical representation of a different one of the nodes, a graphical representation of each of the observed instances of the service operation represented by the different node and a graphical representation of links between calling and called ones of the observed instances of the service operation represented by the corresponding node and the observed instances of the service operation represented by the different one of the nodes.

12. The computer program product according to claim 11, wherein the aggregated information from all of the executed observed instances and the aggregated information from all of the determined calls is obtained by a monitoring agent operating at each of at least one application servers which are operable in the SOA environment.

13. The computer program product according to claim 11, further comprising computer-readable instructions for persisting each of the created nodes and each of the created links as elements in a markup language document.

* * * * *